United States Patent [19]

Serini et al.

[11] 4,129,612

[45] Dec. 12, 1978

[54] 1,1,3,4,6-PENTAMETHYL-3-(3,5-DIMETHYL-4-HYDROXYPHENYL)-INDAN-5-OL POLYCARBONATES

[75] Inventors: Volker Serini; Gerhard Friedhofen; Dieter Frietag; Jürgen Heuser, all of Krefeld, Germany

[73] Assignee: Bayer Aktiengesellschaft, Leverkusen, Germany

[21] Appl. No.: 782,205

[22] Filed: Mar. 28, 1977

[30] Foreign Application Priority Data

Apr. 7, 1976 [DE] Fed. Rep. of Germany ....... 2615038

[51] Int. Cl.$^2$ ...................... C08L 69/00; C08G 63/62
[52] U.S. Cl. .................................. 260/860; 428/412; 428/458; 528/202; 528/196; 528/201; 528/174
[58] Field of Search ............ 260/47 XA, 463, 77.5 D, 260/823, 860

[56] References Cited

U.S. PATENT DOCUMENTS 3,546,165  12/1970  Morgan .................................. 260/47

*Primary Examiner*—Theodore E. Pertilla
*Attorney, Agent, or Firm*—Gene Harsh; Lawrence S. Pope

[57] ABSTRACT

The present invention is concerned with aromatic thermoplastic polycarbonates which contain at least about 0.5 mole % of structural units derived from 1,1,3,4,6-pentamethyl-3-(3,5 dimethyl-4-hydroxyphenyl)-indan-5-ol. The polymers disclosed herein may be homopolymers of these units or copolymers with other aromatic dihydroxy compounds and/or tri or higher functional branching agents. These homopolymers or copolymers may be used per se or they may be blended with other thermoplastic resins, particularly other aromatic polycarbonates. In addition, these polymers may be used to prepare coatings which may be cross-linked by heat treatment or radiation or they may be used as the base for graft polymerization.

19 Claims, No Drawings

1,1,3,4,6-PENTAMETHYL-3-(3,5-DIMETHYL-4-HYDROXYPHENYL)-INDAN-5-OL POLYCARBONATES

SUMMARY OF THE INVENTION

The present invention relates to aromatic, thermoplastic polycarbonates, especially those of high molecular weight, which contain about 0.5 - 100 mol % of carbonate units derived from 1,1,3,4,6-pentamethyl-3-(3,5-dimethyl-4-hydroxyphenyl)-indan-5-ol according to formula (1)

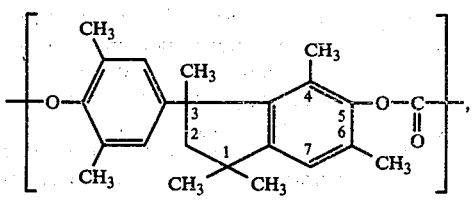

mixtures of two or more of these polycarbonates and mixtures of these polycarbonates with other aromatic polycarbonates. In addition, the present invention relates to a process for preparing polycarbonates containing units of formula (1). The invention also relates to a process for preparing crosslinked coatings or films from such polycarbonates by heat treatment or radiation and the films or coatings so produced. Finally, the invention also relates to a process for grafting addition monomers and polymers onto polycarbonates having structural units of fomula (1) and the graft copolymers so produced.

DETAILED DESCRIPTION

Surprisingly, it has been found that 1,1,3,4,6-pentamethyl-3-(3,5-dimethyl-4-hydroxyphenyl)-indan-5-ol can be converted into high molecular weight polycarbonates and copolycarbonates which have outstanding combinations of properties. It is true that individual properties of the new polycarbonates are also achieved with polycarbonates which are already known. However, the outstanding combinations of properties are new and open up a number of applications for which it has hitherto not been possible to use polycarbonates.

The polycarbonates according to the invention have unexpectedly high second order transition temperatures and thus high heat distortion points. Nevertheless, they can be processed at relatively low temperatures, because the melt viscosity is favorable. The polycarbonates of the invention possess a high heat stability. The high structural viscosity of the melt is also an advantage. The tracking resistance of the polycarbonates according to the invention is outstanding.

Moreover, they can easily be rendered highly flameproof by co-condensation of small amounts, for example about 2 to 15 mol %, relative to co-condensed bisphenols, of 2,2-bis-(3,5-dibromo-4-hydroxyphenyl)-propane and 2,2-bis-(3,5-dichloro-4-hydroxyphenyl)-propane. The polycarbonates according to the invention are very stable to hydrolysis and, thus, are stable to aqueous acids and alkalis and in some cases are also stable to ammonia and amines. In lacquer solvents, they display an outstanding solubility, such as is not customarily found for bisphenol A polycarbonates. Coatings made of the polycarbonates of the invention can be crosslinked by heat treatment or radiation (for example with electron beams); the polycarbonates of the invention can be grafted readily by a free radical mechanism according known methods. The polycarbonates according to the invention display good tolerance with other polycarbonates, for example with those obtained from 2,2-bis-(4-hydroxyphenyl)-propane or 2,2-bis-(3,5-dimethyl-4-hydroxyphenyl)-propane.

While some of the said properties, such as, for example, the heat distortion point and the stability to saponification, become prominent only with higher contents of co-condensed 1,1,3,4,6-pentamethyl-3-(3,5-dimethyl-4-hydroxyphenyl)-indan-5-ol, other properties, such as, for example, the solubility and the tracking resistance, can also already be very pronounced with very low contents of co-condensed 1,1,3,4,6-pentamethyl-3-(3,5-dimethyl-4-hydroxyphenyl)-indan-5-ol.

1,1,3,4,6-Pentamethyl-3-(3,5-dimethyl -4-hydroxyphenyl)-indan-5-ol, which is used for the preparation of the polycarbonates according to the invention, can be obtained in various ways. Thus, it can be obtained from 2,2-bis-(3,5-dimethyl -4-hydroxyphenyl)-propane by scission to give 2,6-dimethyl -4-isopropenylphenol and dimerization thereof, such as is described, for example, by J. Kahovec, H. Pivoca and J. Pospisil in Collect. Czech. Chem. Commun. 36 (1971) 1986-1994.

1,1,3,4,6-Pentamethyl-3-(3,5-dimethyl-4-hydroxyphenyl)-indan-5-ol can also be obtained from 2,6-dimethylphenol and acetone by an acid-catalyzed reaction, for example according to German Patent Application Pat. No. 2 537 027.8 (LeA 16,657).

According to this German Patent Application Pat. No. 2 537 027.8, 1,1,3,4,6-pentamethyl-3-(3,5-dimethyl-4-hydroxyphenyl)-indan-5-ol is obtained as a mixture with 2,2-bis-(3,5-dimethyl-4-hydroxyphenyl)-propane; according to the present invention, it can be polycondensed either direct as a mixture with 2,2-bis-(3,5-dimethyl-4-hydroxyphenyl)-propane or after separating 2,2-bis-(3,5-dimethyl-4-hydroxyphenyl)-propane, for example by crystallization steps, on its own or with other bisphenols to give the polycarbonates according to the invention.

Hitherto, 1,1,3,4,6-pentamethyl-3-(3,5-dimethyl-4-hydroxyphenyl)-indan-5-ol has not been used for the preparation of polycarbonates, although it is a readily accessible compound, but, rather, has been regarded as an undesired by-product in the synthesis of polycarbonates, for example in the case of the preparation of 2,2-bis-(3,5-dimethyl-4-hydroxyphenyl)-propane. (Compare German Patent Application Pat. No. 2 537 027.8).

Polycarbonates in the sense of the invention are homopolycarbonates and copolycarbonates. The polycarbonates have molecular weights $\overline{M}_w$ (weight-average) of, preferably, about 10,000 - 200,000 and more preferably of about 20,000 - 80,000. For the purposes of modification, it is also possible to mix relatively small amounts of low-molecular polycarbonates, for example about 1 - 20% by weight of a low-molecular polycarbonate with molecular weights of $\overline{M}_w$ of about 1,000 - 8,000 into the polycarbonates which have molecular weights of about 10,000 - 200,000, or of about 20,000 - 80,000. In order for the modification to impart flame-resistance, the low-molecular polycarbonate can be, for example, a low-molecular polycarbonate of 2,2-bis-(3,5-dibromo-4-hydroxyphenyl)-propane.

The polycarbonates according to the invention can be prepared, for example, by the two phase boundary process from phosgene and the corresponding bisphenols, or by other processes (melt transesterification processes, solution processes or the pyridine process), such as are described in the literature (see H. Schnell, Chemistry and Physics of Polycarbonates, New York-London-Sidney, Interscience Publishers 1964, Polymer Reviews, Vol. 9 and U.S. Pat. Nos. 3,028,365, 2,999,835, 3,148,172, 3,271,368, 2,991,273, 3,271,367, 3,780,078, 3,014,891 and 2,999,846 as well as DT-OS (German Published Specification) 2,063,050, 2,063,052, 1,570,703, 2,211,956, 2,211,957 and 2,248,817).

The aromatic thermoplastic polycarbonates according to the invention, especially those of high molecular weight, contain about 0.5 to 100 mol % of polycarbonate units derived from 1,1,3,4,6-pentamethyl-3-(3,5-dimethyl-4-hydroxyphenyl)-indan-5-ol according to formula (1); preferably, they contain about 60 – 100 mol % of units of the formula (1) or about 1 – 40 mol % of units of the formula (1) and more preferably they contain about 80 – 100 mol % of units of the formula (1) or about 2 – 15 mol % of units of the formula (1).

One or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl)-sulphoxides, bis-(hydroxyphenyl)-sulphones and α,α'-bis-(hydroxyphenyl)-diisopropylbenzenes, as well as corresponding compounds which are substituted in the nucleus, can form the basis for other carbonate units which are in amounts complementary to the particular amounts of carbonate units of the formula (1) (that is to say in amounts which make up the total amount to 100 mol % in each case). These, and other suitable aromatic dihydroxy compounds are described in U.S. Pat. Nos. 3,028,365, 2,999,835, 3,148,172, 3,271,368, 2,991,273, 3,271,367, 3,780,078, 3,014,891 and 2,999,846 and in DT-OS (German Published Specifications) 1,570,703, 2,063,050, 2,063,052, 2,402,175, 2,402,176 and 2,402,177 and in French Patent No. 1,561,518.

Polycarbonates according to the invention in which at least about half of the complementary amounts of other carbonate units in each case consists of carbonate units based on one or more of the following bisphenols: 2,2-bis-(4-hydroxyphenyl)-propane, 2,2-bis-(4-hydroxyphenyl) sulphide, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(3,5-dimethyl-4-hydroxyphenyl)-methane, 2,2-bis-(3,5-dimethyl-4-hydroxyphenyl)-propane and α,α'-bis-(3,5-dimethyl-4-hydroxyphenyl)-p-diisopropylbenzene are preferred.

The polycarbonates according to the invention in which at least about three-quarters of the complementary amounts of other carbonate units consist of carbonate units based on one or more of the above mentioned bisphenols are particularly preferred. The polycarbonates according to the invention in which at least about half, and preferably at least about three-quarters, of the complementary amounts of other carbonate units consist of carbonate units of 2,2-bis-(3,5-dimethyl-4-hydroxyphenyl )-propane are also particularly preferred.

In the sense in which the term is used above, "the other carbonate units", that is to say carbonate units other than those of the formula (1), have the following formula (2)

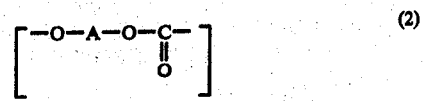

wherein
—O—A—O— are the radicals of the above mentioned bisphenols employed in a particular case.

The polycarbonates according to the invention are used commercially on their own or as a mixture of two or more of the polycarbonates according to the invention; the polycarbonates according to the invention can also be employed as a mixture with other aromatic polycarbonates. Other aromatic polycarbonates in the sense of the present invention are, for example, polycarbonates of 2,2-bis-(4-hydroxyphenyl)-propane or 2,2-bis-(3,5-dimethyl-4-hydroxyphenyl)-propane.

The polycarbonates according to the invention can be branched by incorporating small amounts, preferably amounts of between about 0.05 and 2.0 mol % (relative to the diphenols employed) of compounds which contain trifunctional or more than trifunctional groups, especially those which contain three or more than three phenolic hydroxyl groups.

Polycarbonates of this type are described, for example, in German Offenlegungsschriften (German Published Specifications) Nos. 1,570,533, 1,596,762, 2,116,974, and 2,113,347, British Pat. No. 1,079,821, U.S. Pat. No. 3,544,514 and in German Patent Application Pat. No. P 25 00 092.4 (LeA 16,142) and U.S. Pat. application No. 644,253 filed December 24, 1975.

Some of the compounds containing three or more than three phenolic hydroxyl groups which can be used are, for example, phloroglucinol, 4,6-dimethyl-2,4,6-tri-(4-hydroxy-phenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-orthotherephthalic acid esters, tetra-(4-hydroxyphenyl)-methane, tetra-(4-(4-hydroxyphenyl-isopropyl)-phenoxy)-methane and 1,4-bis-(4',4''-dihydroxytriphenyl)-methyl)-benzene.

Some of the other trifunctional compounds are 2,4-dihydroxybenzoic acid, trimesic acid, cyanuric chloride and 3,3-bis-(4-hydroxyphenyl)-2-oxo-2,3-dihydroindole.

Chain stoppers in the customary amounts can be used to regulate the molecular weights $\overline{M}_w$ of the aromatic polycarbonates according to the invention.

Examples of suitable chain stoppers are phenols, such as phenol, o-, m- and p-cresol, 2,6-dimethylphenol and p-tertiary-butylphenol.

The polycarbonates according to the invention are preferably prepared from $COCl_2$ and the bisphenols by the two-phase boundary process. With this process, chlorinated aliphatic and aromatic compounds, such as, for example, dichloroethane, methylene chloride, chlorobenzene and dichlorobenzene, are generally employed as organic solvents for the polycarbonates. Mixtures of such solvents can also be used. The pH value of the aqueous phase is generally 12 – 14 and preferably above 13. The ratio of the organic phase to the aqueous-alkaline phase can be, for example, 1/1. Alkalis, such as, for example, potassium hydroxide solution or sodium hydroxide solution, can be used as acid acceptors. The reaction temperature is generally about 10°–80° C. Compounds which can be used as catalysts are, in particular, tertiary aliphatic amines, such as, for example, triethylamine, tripropylamine and tributylamine.

The polycarbonates according to the invention can be processed very easily to give moldings, sheets, coatings and fibers. They can also readily be used as mixtures with fillers, such as, for example, minerals, wood flour and carbon black, reinforcing materials, such as, for example, glass fibers, asbestos and carbon fibers, effect substances, dyestuffs, pigments, stabilizers, such as, for example, heat stabilizers, oxidation stabilizers and UV stabilizers, lubricants and mold release agents, flameproofing additives, such as, for example, halogenated organic compounds (even astonishingly small amounts are effective), metal oxides and metal salts, and further additives. They can also be mixed with other polymeric materials. They are of advantage in particular wherever a combination of high stability to saponification, a high heat distortion point and good tracking resistance, coupled with good processability, is of importance. Thus, for example, they can advantageously be used for the production of piping for alkaline and acid solutions, of high-quality electrical components, of electrical insulating sheets, of wire enamels, of coatings for plastics, of housings and of apparatus which can be sterilized by superheated steam.

EXAMPLES

EXAMPLE 1

Preparation of polycarbonates according to the invention by the two-phase boundary process.

The polycarbonates listed in the Table were synthesized as follows: 3,500 ml of $H_2O$ are initially introduced. 456 g (11.4 mols) of NaOH, 1 mol of a bisphenol or bisphenol mixture (see the table) and, optionally, phenol as the chain stopper (see the table) are dissolved in this water, while passing $N_2$ through the mixture. After 3,500 ml of methylene chloride have been added, 297 g (3 mols) of phosgene are introduced. After all of the phosgene has been introduced, 18.5 g (0.1 mol) of tri-n-butylamine are added and the batch is worked up 3 hours later. From the time the NaOH is dissolved until working up, the batch is stirred vigorously and the temperature is kept at 25° C. For working up the aqueous phase is separated off. The organic phase is acidified with dilute $H_3PO_4$ and is then washed until neutral. The polycarbonate is then isolated by evaporating the methylene chloride.

Table relating to Example 1:

Preparation of polycarbonates
PMI = 1,1,3,4,6-pentamethyl-3-(3,5-dimethyl-4-hydroxy-phenyl)-indan-5-ol,
BPA = 2,2-bis-(4-hydroxyphenyl)-propane,
BDB = a,a'-bis-(4-hydroxyphenyl)-p-diisopropyl-benzene,
BPZ = 1,1-bis-(4-hydroxyphenyl)-propane,
TBBPA = 2,2-bis-(3,5-dibromo-4-hydroxyphenyl)-propane.

| Experiment | Bisphenols employed | Ratio of the bisphenols (mol parts) | Chain stopper, phenol (mol % of the sum of the bisphenols) | $\bar{M}_{LS}$ |
|---|---|---|---|---|
| A | PMI | 100 | 2.3 | 33,000 |
| B | PMI/BPA | 85/15 | 2.5 | 34,000 |
| C | PMI/BDB | 85/15 | 2.5 | 33,000 |
| D | PMI/BPZ | 60/40 | 2.5 | 36,000 |
| E | PMI/TMBPA | 60/40 | 2.5 | 34,000 |
| F | PMI/BPA/TBBPA | 25/70/5 | 2.7 | 32,000 |
| G | PMI/BPA | 5/95 | 2.7 | 32,000 |
| H | PMI/BPA | 3/97 | 2.7 | 34,000 |
| I | PMI/TMBPA | 5/95 | 2.7 | 33,000 |
| K | BPA for comparison | 100 | 3.0 | 31,000 |
| L | TMBPA for comparison | 100 | 2.7 | 34,000 |
| M | BPA/ TBBPA for comparison | 95/5 | 3.0 | 33,000 |

EXAMPLE 2

Stability to saponification of polycarbonates according to the invention.

The Tables which follow show the stability of a number of polycarbonates of this invention to saponification by 10% strength boiling sodium hydroxide solution, 10% strength boiling hydrochloric acid and concentrated aqueous ammonia solution at 25° C. Films of the polycarbonates were kept in the said media for 250 hours and the changes were than examined. A polycarbonate of 2,2-bis-(4-hydroxyphenyl)-propane alone (K) was also tested for comparison.

Table A relating to Example 2

Stability to saponification by 10% strength boiling sodium hydroxide solution

| Polycarbonate from Example 1 | Appearance of the films after a storage time of (hours) | | |
|---|---|---|---|
| | 50 | 100 | 250 |
| A | u | u | u |
| B | u | u | u |
| C | u | u | u |
| D | u | u | u |
| E | u | u | u |
| K | d | — | — |

Table B relating to Example 2

Stability to saponification by 10% strength boiling hydrochloric acid

| Polycarbonate from Example | Appearance of the films after a storage time of (hours) | | |
|---|---|---|---|
| | 50 | 100 | 250 |
| A | u | u | u |
| B | u | u | u |
| C | u | u | u |
| D | u | u | u |
| E | u | u | u |
| K | u | t | dec |

Table C relating to Example 2

Stability to saponification by concentrated aqueous ammonia solution

| Polycarbonate from Example | Appearance of the films after a storage time of (hours) | | |
|---|---|---|---|
| | 50 | 100 | 250 |
| A | u | u | u |
| E | u | u | u |
| K | t | dec | — | d = dissolved
u = unchanged
dec = decomposed
t = turbid

EXAMPLE 3

Second order transition temperatures of polycarbonates according to the invention.

The second order transition temperatures (FP) of some of the polycarbonates of the invention are as follows: (measured according differential thermal analysis):

| Polycarbonate from Example 1 | FP [° C] |
|---|---|
| A | 265 |
| B | 246 |
| C | 244 |
| D | 225 |
| E | 241 |
| K (for comparison) | 150 |

EXAMPLE 4

Mixtures of polycarbonates according to the invention with other polycarbonates.

Using the solution in methylene chloride, polycarbonates A and E of Example 1 are mixed with polycarbonates M and N in various ratios by weight, as can be seen from the table. All the films were transparent and exhibited only a single second order transition temperature, which is proof of the homogeneity of the mixtures. This homogeneity is not a matter of course since in most cases even polymers which have only slight differences exhibit demixing.

| Prepared mixtures of polycarbonates (all homogeneous) | | | | | | |
|---|---|---|---|---|---|---|
| Polycarbonate from Example 1 | | | | [parts by weight] | | |
| A | E | K | L | | | |
| x | x | | | 20/80 | 50/50 | 80/20 |
| x | | | x | 20/80 | 50/50 | 80/20 |
| | x | x | | 20/80 | 50/50 | 80/20 |
| | x | | x | 20/80 | 50/50 | 80/20 |

EXAMPLE 5

Flame resistance

The flame resistance of polycarbonate F from Example 1 was compared, in accordance with UL-Subject 94, with that of polycarbonate M from Example 1. Despite the fact that the content of 2,2-bis-(3,5-dibromo-4-hydroxyphenyl)-propane, that is to say the flameproofing component, is approximately the same, polycarbonate F showed, with a value of "VE O" in the classification according to UL, considerably better flame resistance than polycarbonate I, which had a value of "VE II". This is due to the content of 1,1,3,4,6-pentamethyl-3-(3,5-dimethyl-4-hydroxyphenyl)-indan-5-ol.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Aromatic, thermoplastic polycarbonates, characterized in that they contain 0.5 to 100 mol % of carbonate units of the formula (1)

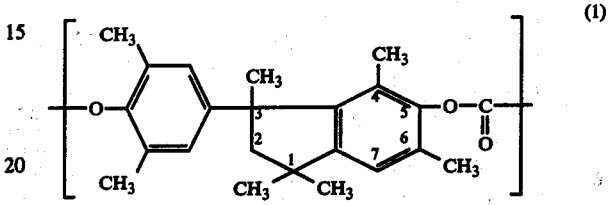

2. Polycarbonates according to claim 1, characterized in that they contain about 60 to 100 mol % of carbonate units of the formula (1).

3. Polycarbonates according to claim 1, characterized in that they contain about 1 – 40 mol % of carbonate units of the formula (1).

4. The polycarbonates of claim 1 which contain about 80 to 100 mol % of carbonate units of formula (1).

5. The polycarbonates of claim 1 which contain about 2 to 15 mol % of carbonate units of formula (1).

6. An aromatic thermoplastic polycarbonate which has a molecular weight, $M_w$, of about 10,000 to 200,000 and which contains about 1 to 40 or 60 to 100 mol % of structural units of the formula (1)

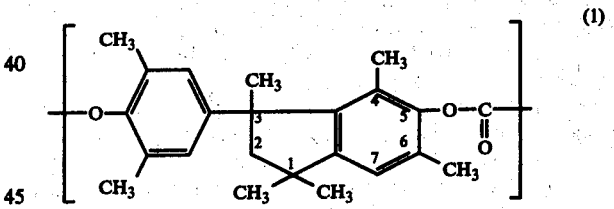

and a complimentary amount of about 99 to 60 or 40 to 0 mol % of structural units of the formula

wherein A is the residue of an aromatic dihydroxy compound after the removal of its hydroxyl groups.

7. The polycarbonate of claim 6 wherein A is derived from compounds selected from the group consisting of hydroquinone, resorcinol, dihydroxydiphenyls, bis-hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl)-sulphoxides, bis-(hydroxyphenyl)-sulphones and α,α'-bis-(hydroxyphenyl)-diisopropylbenzenes, and corresponding compounds which are substituted in the nucleus.

8. The polycarbonate of claim 7 wherein A is derived from 2,2-bis-(3,5-dimethyl-4-hydroxyphenyl)-propane.

9. The polycarbonate of claim 7 wherein 2 to 15 mol % of the structural units are based on 2,2-bis-(3,5 dichloro-4-hydroxyphenyl)-propane or 2,2-bis-(3,5 dibromo-4-hydroxyphenyl)-propane.

10. The polycarbonate of claim 6 which contains about 0.05 to 2.0 mol % of a branching structural unit based upon compounds which are at least trifunctional in polycarbonate synthesis.

11. The polycarbonate of claim 10 wherein the branching unit is based upon compounds which are functional through phenolic OH groups.

12. A mixture of the polycarbonate of claim 6 with an aromatic thermoplastic polycarbonate having a structural formula (2)

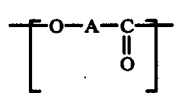
(2)

wherein A is the residue of an aromatic dihydroxy compound, other than 1,1,3,4,6-pentamethyl-3-(3,5-dimethyl-4-hydroxyphenyl)-indan-5-ol, after the removal of its hydroxyl groups.

13. The mixture of claim 12 wherein the polycarbonate of structural formula (2) is based on 2,2-bis-(4-hydroxyphenyl)-propane or 2,2-bis-(3,5 dimethyl-4-hydroxyphenyl)propane.

14. A mixture of the polycarbonate of claim 6 with a polycarbonate having a $\overline{M}_w$ of about 1,000 to 8,000.

15. The mixture of claim 14 wherein the low molecular weight polycarbonate is based on 2,2-bis-(3,5 dibromo-4-hydroxyphenyl)-propane.

16. In a process for the production of polycarbonates wherein aromatic dihydroxy compounds are synthesized in manners known to produce polycarbonate, the improvement wherein 0.5 to 100 mol % of said compounds are 1,1,3,4,6 pentamethyl-3-(3,5 dimethyl-4-hydroxyphenyl)-indan-5-ol.

17. The improvement of claim 16 wherein the synthesis is by means of the two phase boundry process using $COCl_2$.

18. The aromatic thermoplastic polycarbonate of claim 6 wherein the molecular weight, $M_w$, is about 20,000 to 80,000 and wherein at least about 75 mol % of the structural units of the formula

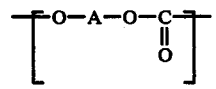

have A based compounds selected from the group consisting of 2,2-bis-(4-hydroxyphenyl)-propane, 2,2-bis-(4-hydroxyphenyl) sulphide, 1,1-bis-(4-hydroxyphenyl)-cyclohexane, α,α'-bis-(4-hydroxyphenyl)-p-disopropylbenzene, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(3,5-dimethyl-4-hydroxyphenyl)-methane, 2,2-bis-(3,5-dimethyl-4-hydroxyphenyl)-propane and α,α'-(3,5-dimethyl-4-hydroxyphenyl)-p-diisopropylbenzene.

19. The polycarbonate of claim 18 wherein A is based upon 2,2-bis-(3,5-dimethyl-4-hydroxyphenyl)-propane.

* * * * *

UNITED STATES PATENT AND TRADEMARK OFFICE
CERTIFICATE OF CORRECTION

PATENT NO. : 4,129,612

DATED : December 12, 1978

INVENTOR(S) : Volker Serini; Gerhard Friedhofen; Dieter Freitag and Jürgen Heuser It is certified that error appears in the above-identified patent and that said Letters Patent are hereby corrected as shown below:

Please correct the spelling of the name of the third inventor to read --DIETER FREITAG--.

Column 3, at lines 6 and 35, delete the patent number "3,271,368"; same column at lines 6 and 36, delete the patent number "3,780,078"; same column at lines 7 and 36, delete the patent number "3,014,891".

Column 4, please correct line 47 to read --1,4-bis-((4', 4"-dihydroxytriphenyl)-methyl)-benzene.--

Column 8, at the beginning of line 60, please correct "hydroxyphenyl)" to --(hydroxyphenyl)--.

Column 10, at the end of line 31, please correct "$\alpha,\alpha'$-(3,5" to --$\alpha,\alpha'$-bis-(3,5- --.

Signed and Sealed this

Twenty-ninth Day of May 1979

[SEAL]

Attest:

RUTH C. MASON
Attesting Officer

DONALD W. BANNER
Commissioner of Patents and Trademarks